(12) United States Patent
Guerineau

(10) Patent No.: US 8,177,261 B2
(45) Date of Patent: May 15, 2012

(54) DEVICE FOR COLLECTING FUEL LEAKS ON THE SUPPLY PIPES OF AN INTERFACE

(75) Inventor: Thierry Guerineau, Blois (FR)

(73) Assignee: Senior Automotive Blois SAS, Blois (FR)

( * ) Notice: Subject to any disclaimer, the term of this patent is extended or adjusted under 35 U.S.C. 154(b) by 51 days.

(21) Appl. No.: 12/449,773

(22) PCT Filed: Feb. 26, 2008

(86) PCT No.: PCT/FR2008/000251
§ 371 (c)(1),
(2), (4) Date: Mar. 11, 2010

(87) PCT Pub. No.: WO2008/122722
PCT Pub. Date: Oct. 16, 2008

(65) Prior Publication Data
US 2010/0186829 A1    Jul. 29, 2010

(30) Foreign Application Priority Data

Feb. 27, 2007  (FR) ..................................... 07 01403

(51) Int. Cl.
*F16L 25/00* (2006.01)

(52) U.S. Cl. .............. 285/13; 285/14; 285/354; 123/468

(58) Field of Classification Search ................. 285/13, 285/14, 386, 354; 123/468
See application file for complete search history.

(56) References Cited

U.S. PATENT DOCUMENTS

| | | | | |
|---|---|---|---|---|
| 859,426 | A | * | 7/1907 | Betz ................................ 285/13 |
| 900,533 | A | * | 10/1908 | Hawley ........................... 285/13 |
| 1,664,125 | A | * | 3/1928 | Lowrey ............................ 285/13 |
| 3,288,494 | A | * | 11/1966 | Callahan, Jr. et al. .......... 285/14 |
| 4,185,462 | A | * | 1/1980 | Morse et al. .................... 285/13 |
| 5,094,480 | A | * | 3/1992 | Boileau ........................... 285/14 |
| 5,263,312 | A | * | 11/1993 | Walker et al. ................... 285/13 |
| 6,062,605 | A | * | 5/2000 | Goshima et al. ................ 285/13 |
| 6,588,806 | B2 | * | 7/2003 | Arosio ............................ 285/13 |
| 2005/0045154 | A1 | | 3/2005 | Marksteiner et al. .......... 123/468 |
| 2007/0283932 | A1 | | 12/2007 | Marksteiner et al. .......... 123/468 |

FOREIGN PATENT DOCUMENTS

| | | |
|---|---|---|
| DE | 19913803 | 10/2000 |
| GB | 1212818 | 11/1970 |
| JP | 2000320426 | 11/2000 |
| WO | 03087567 | 10/2003 |

* cited by examiner

*Primary Examiner* — David E Bochna
(74) *Attorney, Agent, or Firm* — Jacobson Holman PLLC

(57) ABSTRACT

A device for collecting fuel leaks on the feed pipes of an interface, such as a fuel injection system for a thermal engine. Each feed pipe includes at each end a nut to secure the feed pipe in position on an interface, behind which nut is arranged a device for collecting fuel leaks. The recovery unit includes a spout and is integral with the nut and with the feed pipe in a sealing manner.

4 Claims, 1 Drawing Sheet

DEVICE FOR COLLECTING FUEL LEAKS ON THE SUPPLY PIPES OF AN INTERFACE

This is a national stage of PCT/FR08/000251 filed Feb.26, 2008 and published in French, which has a priority of French no. 07 01403 filed Feb.27, 2007, hereby incorporated by reference.

FIELD OF THE INVENTION

The present invention relates to a device for collecting fuel leaks on the feed pipes of an interface, such as a fuel injection system for a thermal engine.

BACKGROUND OF THE INVENTION

In a fuel injection system, the fuel is conveyed by means of pipes connected on the interfaces comprising pumps, rails and injectors. Thus, a high-pressure pump distributes the fuel to a common rail by means of a pipe connecting the pump to the rail. The fuel is then transported towards the injectors by pipes which connect the rail to the injectors.

Each end of a pipe is formed by a connector which is generally spherical in shape which allows a slight inclination of the pipe, said pipe being screwed and tightened on the interface in order to fix the position held by the pipe and to produce a sealing effect in this region.

However, it is always possible for fuel leaks to occur at each connection: devices for collecting these accidental leaks, to channel them and direct them towards a low-pressure circuit have already been proposed.

Thus, FR-2878935A describes a protection device suitable for a pressurized fuel feed pipe connection, especially a high-pressure pipe of a fuel injection pump for an internal combustion engine of a motor vehicle. This device comprises two protection elements delimiting an enclosed area for confining fuel leaks from the connection, and an evacuation orifice which is made in the region of these protection elements and is capable of allowing fuel to flow outside.

The main disadvantage of a prior art device of this type is, on the one hand, its size and, on the other hand, the risk of leaks occurring in the region of the joining plane of the two protection elements.

The same type of collection devices are described in documents DE-20314164 and U.S. Pat. No. 5,185,144.

Likewise, a known device for collecting leaks is described in GB-1,212,818-A, but this device is unable to recover leaks in the region of the connection between the feed pipe and the injector.

Finally, document WO-03/087567-A relates to an injector comprising a leak connection for the injection of fuel into the combustion chamber of an internal combustion engine, the leak connection being produced from a single piece with an injector element and comprising a leak connection sleeve which is formed integrally to connect a leak return conduit. A recess is formed in the injector in a transition location between a leak bore in the leak connection and a leak admission bore in the injector, and the recess is configured as a groove which completely surrounds the injector.

The leak connection is mounted on the injector: it is thus mounted in a rigid manner on the injector and allows permanent leaks to be collected. Furthermore, it is necessary to produce a groove in the internal wall of the injector. Thus, an assembly of this type does not allow any degree of freedom between the injector and the feed pipe. In addition, the sealing effect between the leak connection of the injector is reinforced by o-rings on either side of the groove.

SUMMARY OF THE INVENTION

Therefore, an aim of the present invention is to provide a device for collecting fuel leaks, which device makes it possible to collect potential fuel leaks and to direct them towards the low-pressure return circuit to the tank: this prevents any risk of contact between a fuel leak and hot elements of the engine or safety elements, such as the brake discs.

Another aim of the invention is to provide a device of this type, while making it possible for the feed pipe to assume different inclinations with respect to the injector.

These aims as well as others which will be revealed below are addressed by a device for collecting fuel leaks on the feed pipes of an interface, such as a fuel injection system for a thermal engine, each feed pipe comprising at each end a nut for securing it in position on an interface, behind which nut is located a device for collecting fuel leaks. Said device is characterised by the present invention in that it comprises a recovery unit comprising a spout and in that it is integral, in a sealed manner, with the nut and the feed pipe, each end of the feed pipe is of a spherical or conical shape externally so as to cooperate with the internal wall of the free end of the corresponding interface, and upstream of this end the feed pipe comprises a bulge which forms a stop for the nut.

The nut preferably comprises a cylindrical apron and a retaining ring which is arranged inside said apron, being integral therewith and cooperating with the bulge forming the stop, this determining a downstream compartment which is screwed onto the external wall of the corresponding interface and a second lower compartment which cooperates with a recovery unit.

There is advantageously arranged in the downstream compartment a cylindrical joint which rests on one side against the wall on the free end of the interface and, on the other side, against the retaining ring.

The recovery unit which is a bell-shaped part made of a supple, leak proof material preferably surrounds the feed pipe, is attached in a sealing manner against the retaining ring in the second compartment and comprises a spout, the top of the bell clasping the feed pipe in a sealing manner.

According to a variant of the present invention, the external wall of the feed pipe situated in the region of the retaining ring comprises at least one channel to facilitate the discharge of the fluid arising from a leak between the end of the feed pipe and the interface, from the second compartment to the compartment downstream.

According to another embodiment, the retaining ring comprises at least one channel to facilitate the discharge of the fluid arising from a leak between the end of the feed pipe and the interface, from the first compartment to the second compartment.

BRIEF DESCRIPTION OF THE DRAWINGS

The following non-limiting description should be read with reference to the accompanying Figures, of which.

DETAILED DESCRIPTION OF THE PREFERRED EMBODIMENTS

Figure 1:
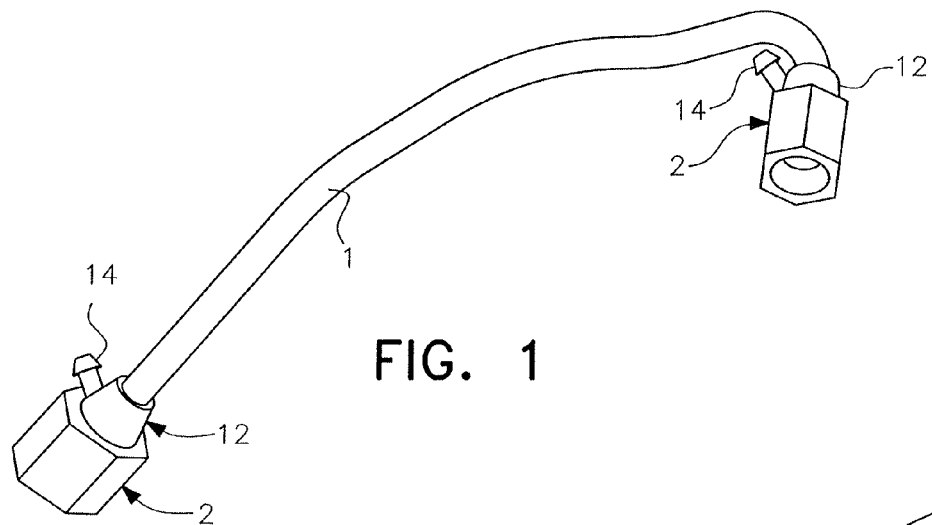
FIG. 1 shows a feed pipe, the ends of which comprise a device for collecting leaks in accordance with the present invention.
Figure 2:
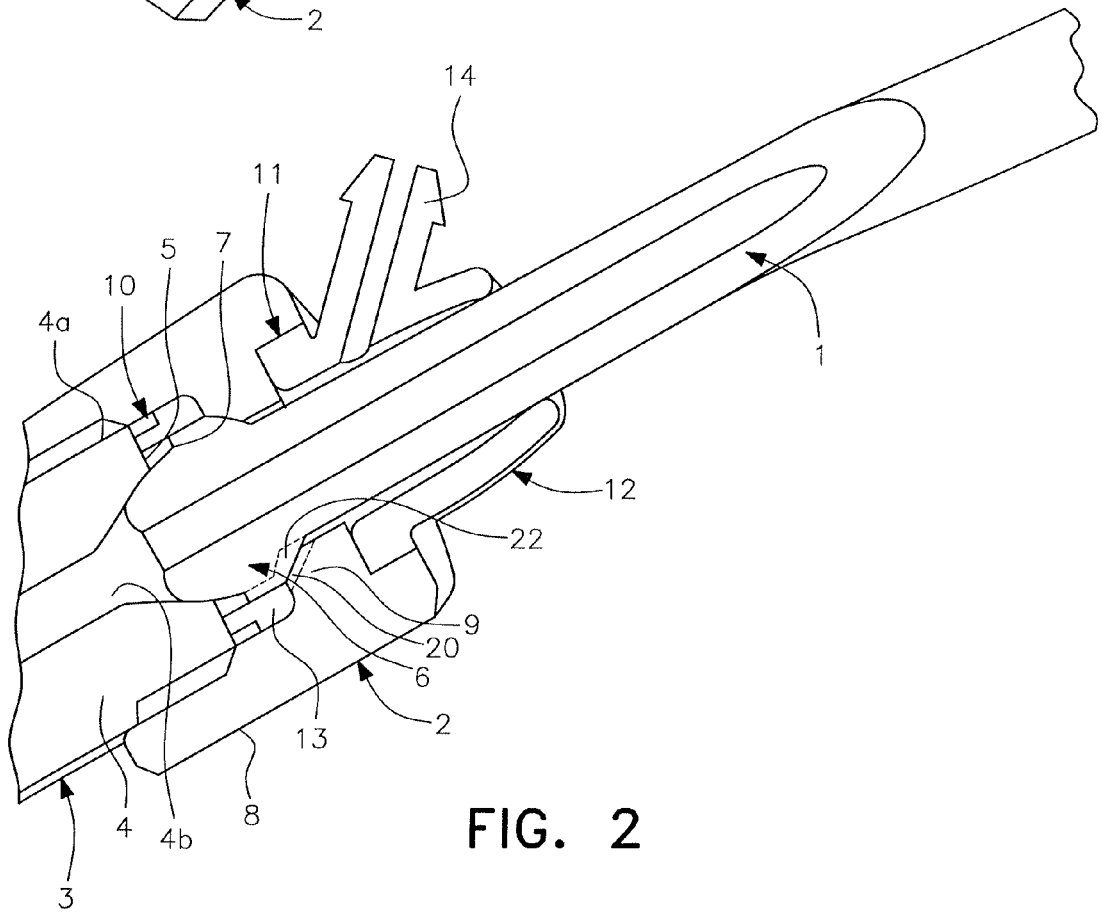
FIG. 2 is a longitudinal section of an end of a pipe comprising the device according to FIG. 1 mounted on an interface.

As can be seen in these Figures, a feed pipe 1 comprises at each end a nut 2 to secure it in position on an interface 3, behind which nut is arranged a device for collecting fuel leaks.

The interface 3 comprises a tubular connection portion 4, of which the external wall 4a is threaded and the cylindrical internal wall 4b opens out only at its free end 5.

Each end 6 of the feed pipe 1 is spherical or conical externally so as to cooperate with the internal wall 4b of the free end 5 of the corresponding interface 3. Upstream of this end 6, the feed pipe 1 comprises a bulge 7 forming a stop for the nut 2.

This nut 2 comprises a cylindrical apron 8 and a retaining ring 9 arranged inside this apron 8, being integral therewith and cooperating with the shoulder 7: this determines a first compartment 10 which is screwed onto the external wall 4a and a second lower compartment 11 which cooperates with a recovery unit 12.

Located in the first compartment 10 is a cylindrical joint 13 which rests on one side against the wall on the free end 5 of the interface 3 and, on the other side, against the retaining ring 9.

The recovery unit 12 is a bell-shaped part made of a supple, leak proof material: it surrounds the feed pipe 1 and is attached in a sealing manner against the retaining ring 9 in the second compartment 11. This recovery unit 12 comprises a spout 14. The top of the bell clasps the feed pipe 1 in a sealing manner, even if the feed pipe 1 has a certain inclination with respect to the connection portion 4 of the interface 3 in a known manner.

Thus, if a fuel leak occurs at the connection between the ends of the feed pipe 1 and the interface 3, this fuel is collected in the space delimited in the first compartment 10 by the cylindrical joint 13: the fuel which has thus been collected can flow into the space or channel 20 which exists or has been made between the retaining ring 9 and the feed pipe 1 in order to pass into the recovery unit 12 and flow away through the spout 14.

According to a variant embodiment of the present invention, the external wall of the feed pipe 1 located in the region of the retaining ring 9 comprises at least one channel 22 to facilitate the discharge of the fluid arising from a leak between the end of the feed pipe 1 and the interface 3, from the first compartment 10 to the second compartment 11.

Due to the fact that each end 6 of the feed pipe 1 is of a spherical or conical shape externally, the feed pipe is able to have any possible inclination with respect to the injector: this positioning freedom is a constraint which cannot be considered with the known devices.

The inventions claimed is:

1. A device for collecting fuel leaks on feed pipes of an interface, each feed pipe including at each end a nut for securing the feed pipe in position on an interface, behind which nut is located a device for collecting fuel leaks, said device for collecting fuel leaks comprising
   a recovery unit having a spout integral in a sealing manner with said nut and said feed pipe, each end of the feed pipe being spherical or conical externally so as to cooperate with an internal wall of a free end of the corresponding interface, upstream of the end the feed pipe including a bulge forming a stop for the nut,
   the nut including a cylindrical apron and a retaining ring arranged inside said apron and integral with said apron and cooperating with the bulge, the bulge and the retaining ring defining a first compartment screwed onto an external wall of the corresponding interface, and
   a second lower compartment cooperating with the recovery unit,
   the recovery unit being a bell-shaped part made of a supple, leak proof material surrounding the feed pipe and attached in a sealing manner against the retaining ring in the second compartment, a top of the bell-shaped part clasping the feed pipe in a sealing manner.

2. The device according to claim 1, wherein a cylindrical joint is located in the first compartment resting on one side against a wall of a free end of the interface and on the other side against the retaining ring.

3. The device according to claim 1, wherein the external wall of the feed pipe located in a region of the retaining ring includes at least one channel to facilitate discharge of fluid arising from a leak between the end of the feed pipe and the interface, from the first compartment to the second compartment.

4. A device according to claim 1, wherein the retaining ring includes at least one channel to facilitate discharge of fluid arising from a leak between the end of the feed pipe and the interface, from the first compartment to the second compartment.

* * * * *